United States Patent [19]

Johnson et al.

[11] Patent Number: 4,954,965
[45] Date of Patent: Sep. 4, 1990

[54] ENHANCED FRAME UTILIZATION FOR CSMA/CD COMMUNICATION PROTOCOL

[75] Inventors: John M. Johnson, Byron; James A. Rocke, Rochester, both of Minn.; Divakara K. R. Udupa, Durham, N.C.

[73] Assignee: International Business Machines Corporation, Armonk, N.Y.

[21] Appl. No.: 308,852

[22] Filed: Feb. 9, 1989

[51] Int. Cl.$^5$ .................. G06K 15/00; H04L 11/00
[52] U.S. Cl. .................. 364/514; 340/825.5; 370/91; 364/200; 364/260; 364/260.1
[58] Field of Search .................. 364/514, 200, 900; 370/91-94; 340/825.5

[56] References Cited

U.S. PATENT DOCUMENTS

| | | | |
|---|---|---|---|
| 4,543,654 | 9/1985 | Jones | 370/94 |
| 4,688,035 | 8/1987 | Gray et al. | 340/825.52 |
| 4,745,559 | 5/1988 | Willis et al. | 364/514 |
| 4,750,137 | 6/1988 | Harper et al. | 364/514 |
| 4,757,460 | 7/1988 | Bione et al. | 364/514 |
| 4,771,391 | 9/1988 | Blasbalg | 364/514 |
| 4,837,679 | 6/1989 | Wiles, Jr. et al. | 364/514 |

OTHER PUBLICATIONS

IEEE Computer Society, *IEEE Standards for Local Area Networks: Carrier Sense Multiple Access With Collision Detection (CSMA/CD)*, 1985, pp. 23-27.

*Primary Examiner*—Parshotam S. Lall
*Assistant Examiner*—Brian M. Mattson
*Attorney, Agent, or Firm*—Bradley A. Forrest

[57] ABSTRACT

In a CSMA/CD communication protocol, data to be sent from one device on a communication network to another is put into frames, or predetermined sized pieces of information. One of the fields in a frame, the pad field, is used to make the total size of the frame large enough to ensure that a collision anywhere in the network with another frame is detected by the senders. The pad field is further used to identify when a data record will be continued in the next frame and also to identify when multiple data records are being sent in the same frame.

11 Claims, 8 Drawing Sheets

FIG. 1

Logical Link Control (LLC) frame:

Medium Access Control (MAC) frame:

FIG. 2

M = 1 - All but last record
0 - in last record

FFF FFFF - gives data frame number

FIG. 3

| 0000 - 0000 | I1 | I2 | I3 | I4 |

M = 0
FFF FFFF = 000 0000

FIG. 4a

N - Number of records blocked
$l_1, l_2, l_3, l_4, l_5$ ------ are lengths of each record.

Blocked Records
x - 0
FFF FFFF - 000 0000 - All bits set to zero.

FIG. 4b

SOURCE FRAME OPTIMIZER

ENHANCED FRAME UTILIZATION FOR CSMA/CD COMMUNICATION PROTOCOL

INCORPORATION BY REFERENCE

U.S. Pat. No. 4,771,391 to Blasbalg and assigned to International Business Machines Corporation is hereby incorporated by reference.

BACKGROUND OF THE INVENTION

The present invention relates to carrier sense multiple access with collision detect communication methods, and in particular to the optimization of frame usage therein.

In current carrier sense multiple access with collision detect (CSMA/CD) communication protocols, several devices are coupled by a communications cable/bus in a network. If a first device has data to send to another device, it senses the carrier or cable to see if another device is presently transmitting data. If no other device is using the cable, the first device transmits the data and also listens on the line to make sure that the data did not collide with data being sent by another device. The data is packaged into an entity called a frame consistent with IEEE standard 802.3, CSMA/CD Access Method and Physical Layer Specifications. The frame, in addition to the actual data, includes information to identify the source and destination of the frame, type of frame, start of frame, checking data, preamble and a pad area.

Frame length is agreed upon by the devices, and should be long enough so that collisions can always be detected. It has been varied based on the amount of traffic on a network in an effort to maximize bandwidth utilization. U.S. Pat. No. 4,543,654 to Jones describes a way of ensuring that the preamble is long enough to ensure collision detection. In this patent, the size of the preamble is varied depending on the propagation characteristics of the communication network.

One problem associated with CSMA/CD networks is that only one record can be transmitted at a time. This can cause difficulties if the size of a record is larger or smaller than the room left in a frame for data. One can try to optimize the size of the frames to accommodate the average size of data, but the frame must still be large enough to ensure collision detection. U.S. Pat. No. 4,771,391 describes a method of optimizing the length of information packets to minimize delay in a node gaining access to a network. In a different communication protocol as described in U.S. Pat. No. 4,688,035 to Gray et al., a "more bit" in a length of data field was used to indicate that a further part of a record will be coming in a future frame. In the IEEE standard, there is no field defined for insertion of a "more bit."

Where the data comprises several smaller records, they are sent one at a time with the pad field increased to fill up the rest of the frame. This is quite wasteful from at least two perspectives. First, when each frame is sent, there is the possibility of a collision. If a collision occurs, the frame must be present at a later time as determined by a retry protocol. Since the data is broken into multiple frames, each of which is subject to a new chance of collision, there is an increased chance of collision for transmission of the record. Further, if all of the data from multiple devices are being broken apart to be sent, there are many more frames being transmitted, again increasing the chance of collision.

SUMMARY OF THE INVENTION

In a CSMA/CD communication protocol, data to be sent from one device on a communication network to another is put into frames or predetermined sized pieces of information. One of the fields in a frame, the pad field, is used to make the total size of the frame large enough to ensure that a collision anywhere in the network with another frame is detected by the senders. The pad field is modified by the present invention to identify when a data record will be continued in the next frame and also to identify when multiple data records are being sent in the same frame. In this manner, the utilization of the predetermined sized frames is optimized.

In one preferred embodiment, the first byte in the pad field contains a more bit. The next 7 bits indicate frame sequence. This helps in assembling the data record in proper order at the receiving device. When large records are divided into pieces, the more bit is set to on. It is set to off in the last data frame. It is also set to off if data is not broken into smaller pieces.

When the data to be sent consists of a number of small records, the records are blocked to bring the data frame transmitted to the predetermined optimum size. A record may consist of 80 bytes of data, i.e. one line of print on an 80 character wide display or any other desired length. For blocking the records, the pad field is modified to include the record lengths. At least four records are combined in this manner, although benefits are obtained by combining two or more records.

In a further embodiment, a byte in the pad field indicates the number of records blocked and the length of each blocked record. The number of records blocked enables the identification of the lengths of records versus arbitrary padded data.

The breaking of large records into multiple frames insures that the device sending a large record does not monopolize the communication medium. Other devices will have an opportunity to send frames instead of one long frame from a single device tying up the network. It also preserves the frame size which is calculated to optimize the bandwidth utilization of the network. The same is true for the blocking of records. Rather than sending four separate frames, which would cause extra contention, and increased chance of collision, all four records are sent in a single frame.

While breaking of large records has been done in different communication protocols and blocking of small records has been done in at least some input/output protocols, neither has been done in a CSMA/CD environment. As higher bandwidth communication medium, such as optical fiber communication lines, become available, it is clear that a significant limitation of CSMA/CD is the time it takes for a frame to propagate the length of the medium. This is about the time it takes to detect a collision and is not improved by medium bandwidth improvements. The present invention provides a much greater flexibility in how data is packaged into frames and makes optimal use of such frames whose length has been chosen based on the propagation time for the medium. Thus, by packaging the data in accordance with the present invention, the frame length can be chosen as desired to maximize the available bandwidth. The frame usage is also maximized, thus further increasing utilization of the available bandwidth.

DETAILED DESCRIPTION

Figure 1:
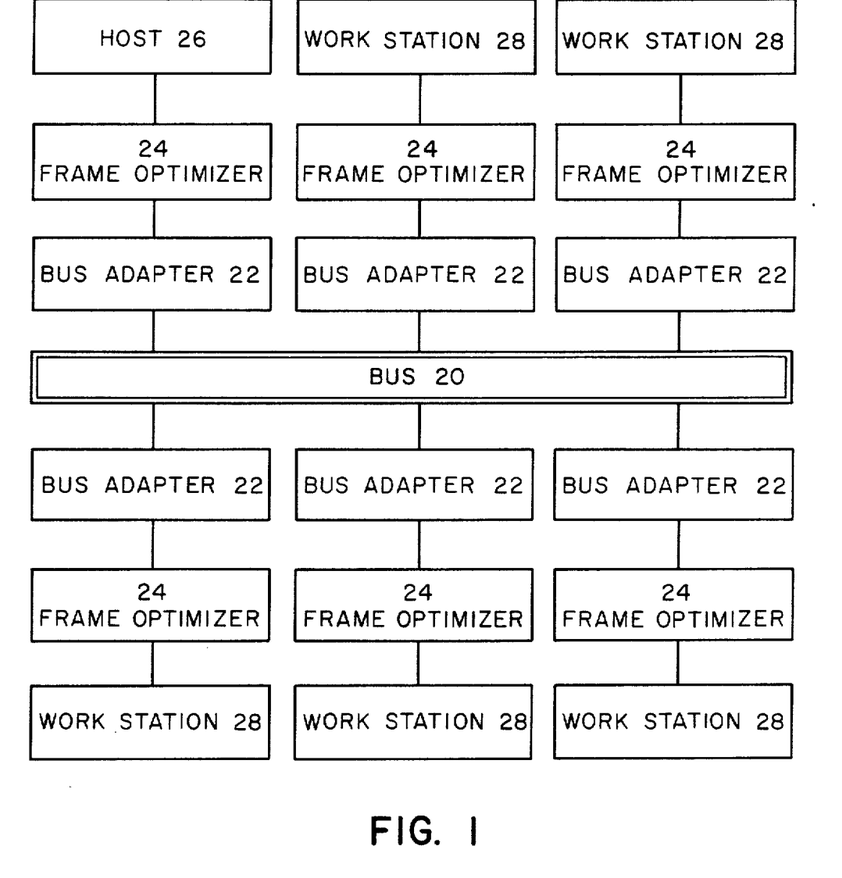
FIG. 1 is a block diagram of a bus configuration which utilizes frame usage optimization.

The invention will be described in conjunction with an example bus network multiple access local area network shown in FIG. 1. However, the invention is applicable to a wide variety of local area networks including both bus topologies as well as ring topologies and is not limited to a particular access method or protocol.

In accordance with the invention, each node on the bus 20 comprises a bus adapter 22, a frame optimizer 24 and a utilization device, such as a host 26 or a workstation 28. Workstation 28 usually comprises a keyboard, microprocessor, memory and display. It can also be a printer or secondary storage device such as a tape drive or disk drive.

Figure 5A:
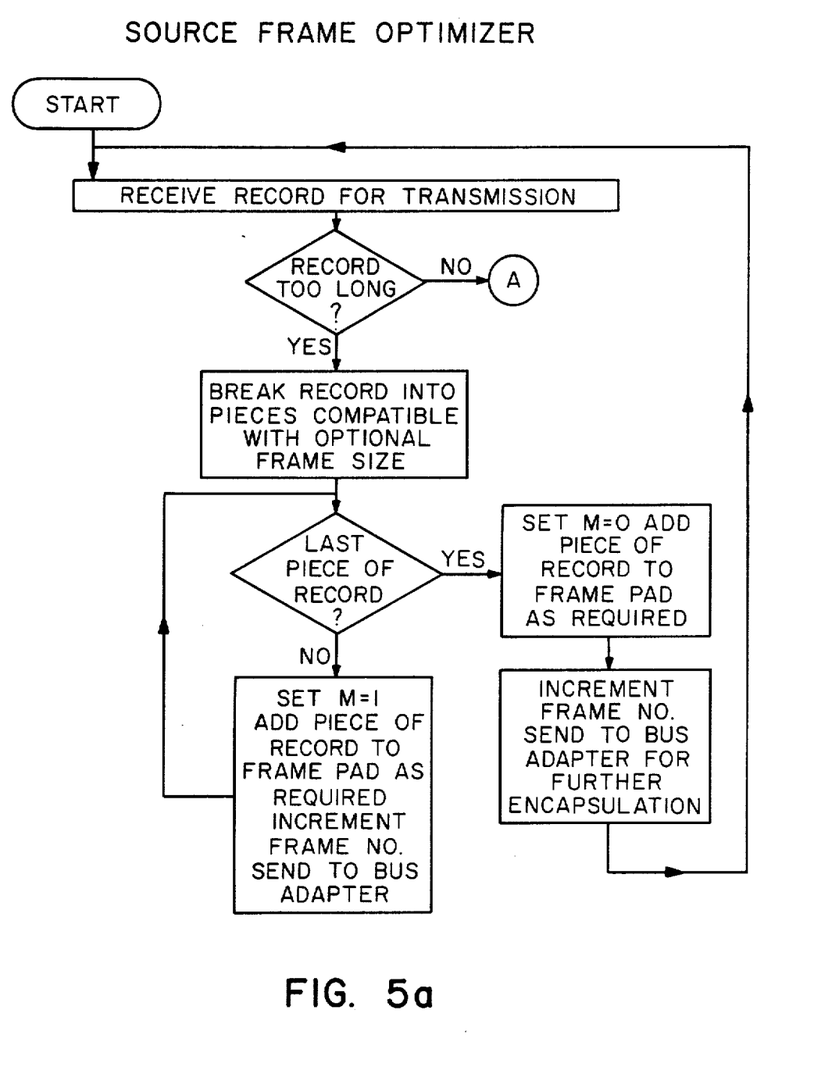
FIGS. 5a and 5b are flow diagrams indicating the assembly of the pad field and data in frames.
Figure 5B:
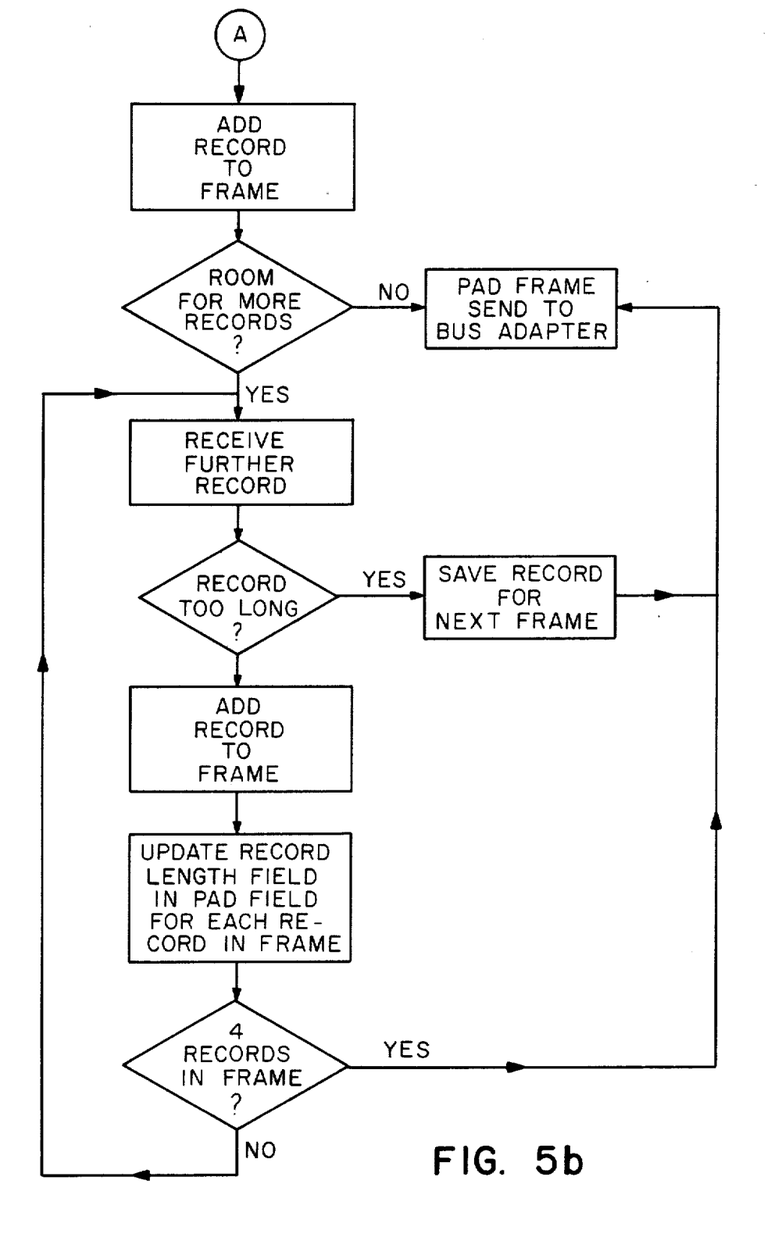
Figure 6:
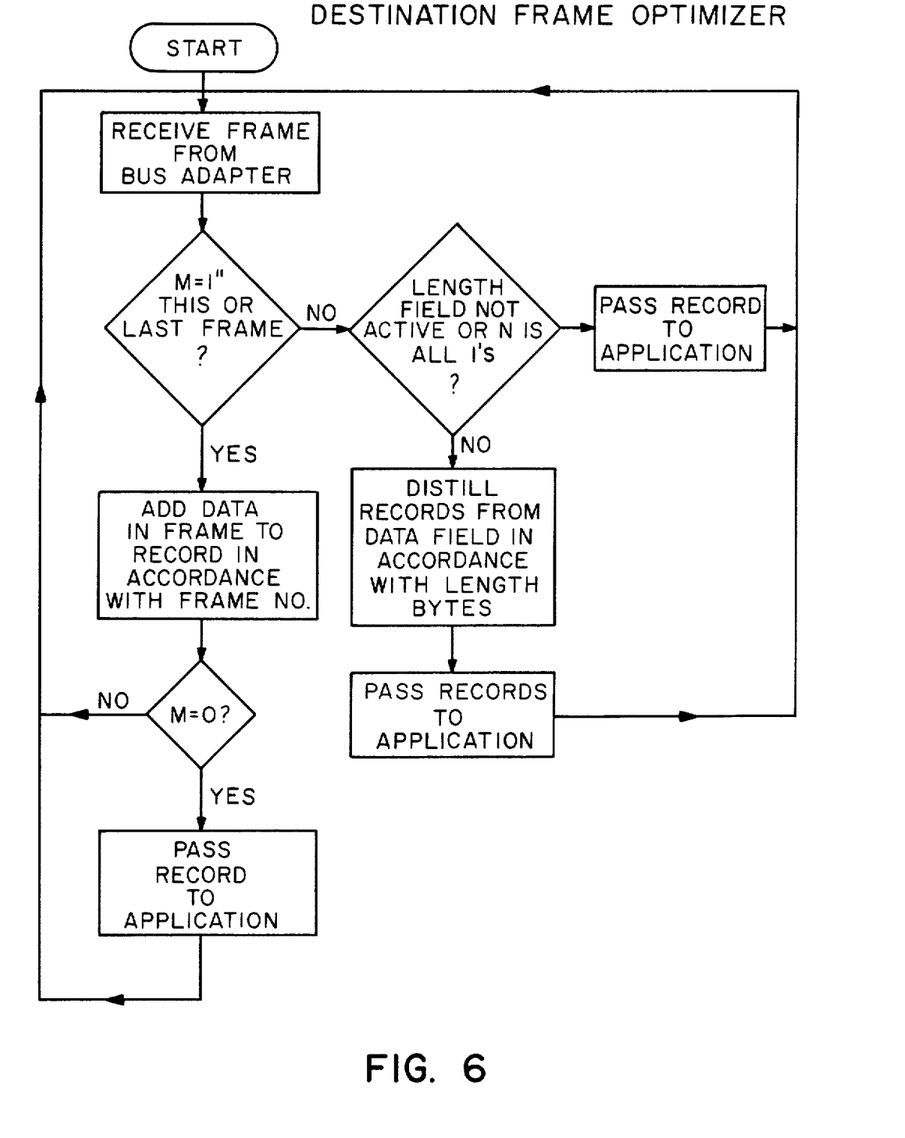
FIG. 6 is a flow diagram indicating the disassembly of the pad field and data from frames.

The invention disclosed herein resides in the frame optimizer 24, the operation of which is shown in greater detail in FIGS. 5 and 6. In accordance with the invention, the frame optimizer will control the blocking and chaining of records transmitted by its node through the bus adapter 22 onto the bus 20 based on the size of the frame. Bus adapter 22 is well known in the prior art and may be similar to a ring adapter, such as described in U.S. Pat. No. 4,507,777 to Tucker, et al. assigned to the IBM Corporation. The bus adapter allows a node to accept and dispatch frames on the bus 20 using a multiple access protocol. It performs electrical signal conversion on data including modulation and demodulation, and it extracts the timing signal from the bus data and uses the timing signal for synchronizing the data onto the bus 20. It also strips the desired data from the frame for use by the frame optimizer 24.

Figure 2:
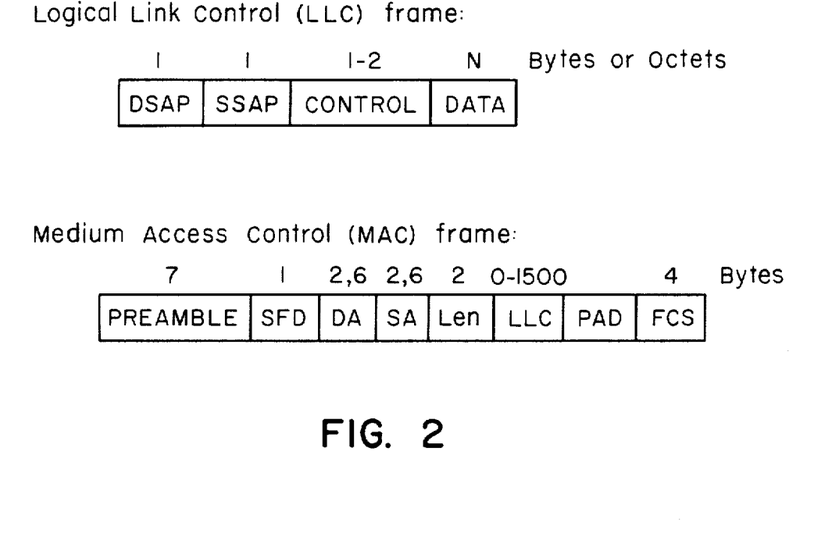
FIG. 2 is a block diagram of a frame used to transmit data in accordance with the present invention.

The frame formats for CSMA/CD are shown in FIG. 2. There are two types of frames, the logical link control (LLC) frame and the medium access control (MAC) frame. The Logical Link Control frame provides end to end error control and acknowledgment. It also provides end to end flow control.

The Medium Access Control frame provides logic for gaining access to the network for frame transmission and reception. Here, considerations like whether the access control is centralized or decentralized and how to access the network come into the picture. For accessing the network usually one of the three approaches—round robin, reservation or contention is used.

The individual fields in the frames are defined as follows:

DSAP - Destination Service Access Point
SSAP - Source Service Access Point
CONTROL - Field to identify frame type and pass control bits.
DATA - Variable length data to be exchanged is put in this field. The frame optimizer selects the blocked or chained records.
PREAMBLE - 7 bytes. A Pattern used by the receiver to establish bit synchronization and the locate the first bit of a frame.
SFD - Start Frame Delimiter (Indicates the start of a frame)
DA - Destination Address.
SA - Source Address.
LEN - Length of LLC field that follows.
LLC - Logical Link Control Frame
PAD - A sequence of bytes added to ensure that the frame is long enough for proper CSMA/CD operation.
FCS - Frame Check Sequence (32 bit cyclic redundancy check). Based on all fields starting with destination address.

The purposes of these fields are well defined in the IEEE 802.3 standard. The PAD field is used to ensure that the frames are long enough so that a collision will always be detected. If a frame is too short, two nodes that are far apart on the network may transmit frames close in time and not see the collision. The frames must be long enough to ensure that they will see the collision and detect bad data. They then wait a time before retransmitting.

Figure 3:
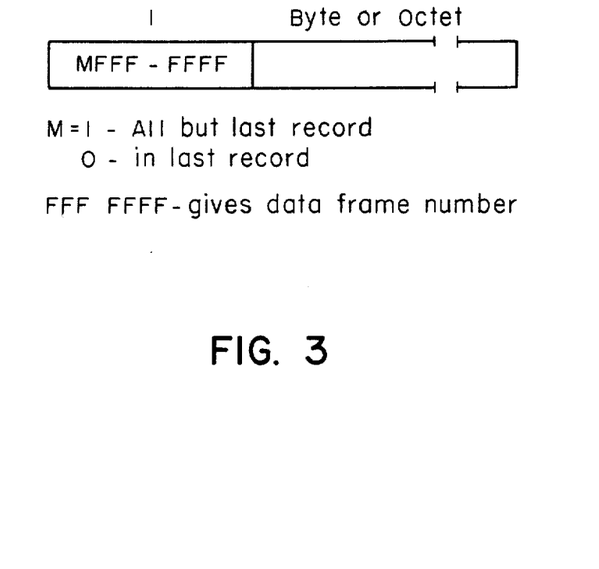
FIG. 3 is a block diagram of a pad field byte of the frame used to indicate that a record will be continued in a further frame.
Figure 4A:
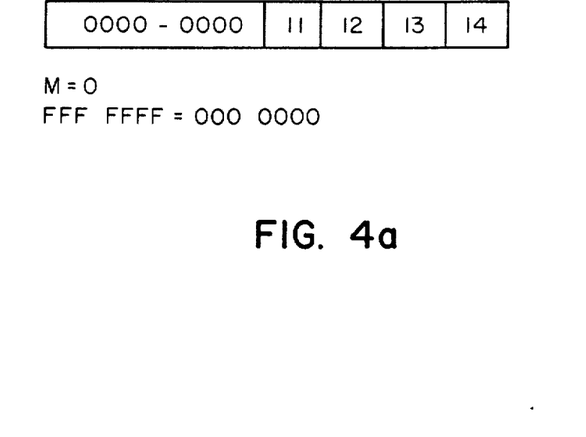
FIG. 4a is a block diagram of pad field bytes used to identify chaining of records.
Figure 4B:
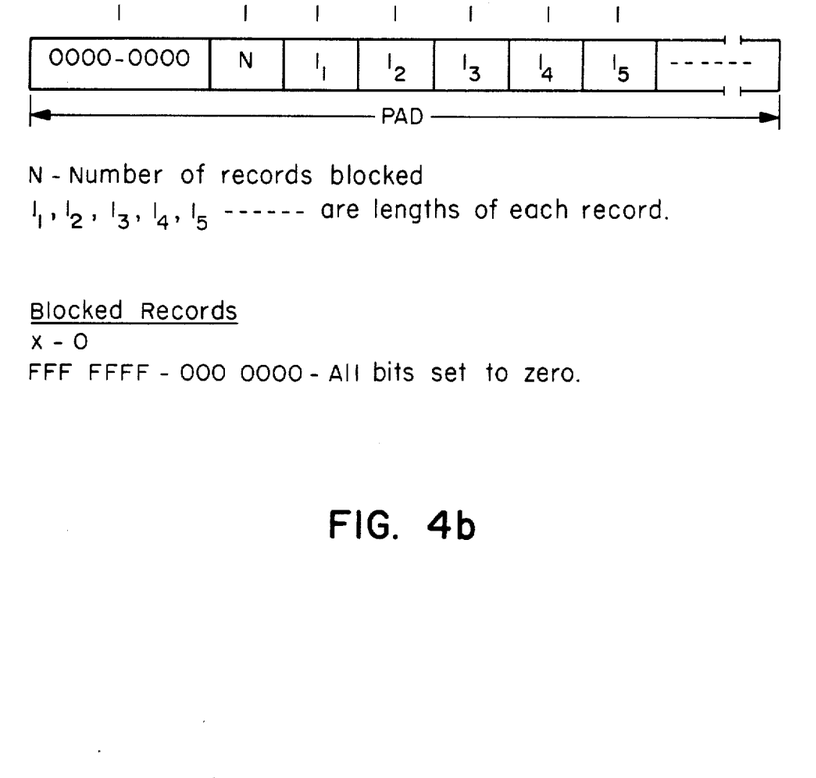
FIG. 4b is a block diagram of pad field bytes used to identify blocking of records.

Modification of the pad field in accordance with the present invention is shown in FIGS. 3, 4a and 4b. In FIG. 3, 1 byte of the pad field, designated a chain field, is modified to include a more bit, designated M. When a record is too large for a frame, the M bit is set to "one" in a frame, and only part of the record is sent in each frame. When all of the record has been sent in multiple frames, the last frame has its M bit set to "zero" to indicate that the last frame for a record has been sent. The receiving node frame optimizer is given the pad field chain byte containing the M bit in addition to the data and reconstructs the record from all the frames.

The remaining bits of the pad field chain byte are labeled F and are used to identify the order of frames comprising a large broken apart record. It is simply the frame number. The pad field bits used for the frame number could be extended to more chain bytes if it is anticipated that very large records will be transmitted. By moving the function of reconstructing records to the frame optimizer and away from the applications running on the workstations or host, such applications do not need to be specially programmed to break apart large records in order to be compatible with the communications protocol.

The format of the pad field for blocking of records is indicated in FIGS. 4a and 4b. The record size can vary from zero to N bytes, where N can be several k bytes in FIG. 4b. For applications like file transfer, where each line of data is a record of about 80 bytes, the records are blocked to bring the data frame transmitted to optimum size. Eighty bytes is a typical record size for most CRT displays and constitutes one line of data. 132 bytes is compatible with wide printers. Other sizes of records are also within the scope of the invention. For blocking the records, or putting them into the same frame, the pad field is modified to include the record lengths. A maximum of four records are blocked as seen in the length indications 11, 12, 13 and 14 in FIG. 4b. The pad field normally has arbitrary or 'do not care data'.

A record is considered short if it is less than the length of data allowed in an optimum size frame. Ideally, a short record is less than one-half the maximum amount of data allowed.

In a further embodiment, a byte of the pad field indicates the number of records blocked. Further bytes in FIG. 4a at 11, 12, 13 and 14 indicate the length of each record. The remainder of the pad field will comprise arbitrarily padded data to obtain minimum frame size required.

In the preferred embodiment, the first byte of the pad field contains the chaining information of FIG. 3, while the succeeding 4 bytes indicate the lengths of the blocked records. If the more bit M is on, and the 4 bytes are non zero as in FIG. 4a, then it is known by the frame optimizer of the destination node that there are records chained in the data portion of the frame.

In FIG. 4b, the pad field is shown for blocking a variable number of records. The bits in the first byte are all set to zero. The second byte "N" indicates the number of records blocked, and $1_1$ - $1_n$ indicates the length of each of the records.

A further byte or bytes in the pad field can be used to identify those nodes which are supporting this extension to the IEEE protocol. After the first communication from a device, these bytes are analyzed by the frame optimizer. Thereafter, it will or will not use frame optimization based on the prior communications from a node. In this manner, nodes having the extended capability can coexist with those not having the capability.

In the flow diagram of FIGS. 5a and 5b, records to be transmitted are received by the frame optimizer from the host or workstation. The next record is investigated to determine if it is too long for an optimum size frame. If it is too long, the record is broken into pieces that are compatible with the predetermined optimal frame size. To be compatible, each piece of the record should fit in the data field of the frame, and the total length of it including the other fields should be substantially equal to the predetermined optimal length. M is set equal to 1 in the frame, and the piece of the record and frame number are added to the frame which is then sent to the bus adapter for further encapsulation or field writing, such as the addition of destination and source information, and the redundancy check. If the last piece of the record was being encapsulated, M is set to zero, and the data and frame number are added to the frame before it is sent to the bus adapter.

If the record was not too long, the flow in FIG. 5b is followed. The record is first added to the frame. A determination is then made if there is room for further records in the frame. If not, the frame is sent to the bus adapter. If there is further room, the next record is received. If it is too long, it is saved for the next frame, and the current frame is sent to the bus adapter where further padding is done. If the next record is not too long, it is added to the frame, and the record length fields for it, and the first record is added to the pad field. This continues for up to 4 records in the preferred embodiment, whereupon the frame is sent to the bus adapter for further encapsulation and transmission.

In FIG. 6, the flow of the destination frame optimizer is detailed. A frame is first received from the bus adapter, and M is checked. If M is "one", or was "one" in the immediately previous frame, the data in the data field is added to a record in accordance with the frame number in the pad field. If M is "zero" in this frame, the record is complete and is passed on to the application running on the host or workstation. If the frame was not part of a chaining operation, or in other words, neither of the last two frames had M set to "one", the length field in the pad field is investigated. If the length field does not indicate that multiple records are present, the record is distilled from the frame and passed on to the application. To distinguish when neither chaining or blocking is being used, the second byte, N in FIG. 4b can be set to all 1's. In this case, the record is passed on to the application. If multiple records are present in the frame, they are distilled in accordance with the length representations and then passed on to the application.

While the invention has been described with respect to one or more embodiments, it will be understood by those skilled in the art that further embodiments are within the scope of the invention. The frame number bits in the chaining field of the pad field may be extended if the records are broken into too many frames to represent in seven bits. A further byte may be taken in frames where records are blocked to indicate that records are blocked rather than relying on the length fields containing data different from padding data. Further use of the pad field to identify whether a device supports this extension of the IEEE CSMA/CD standard is also within the scope of the invention.

What is claimed is:

1. A device for transferring data between nodes coupled to a network having a carrier sense multiple access/collision detect protocol for such data transfer, the device at each node comprising:

means for identifying data records to be transferred to another node;

means coupled to the identifying means for generating frames containing data from the data records to be transmitted;

means coupled to the frame generating means for determining when data from a single record is put into more than one different frame to be transmitted:

means coupled to the frame generating means for inserting in said frames indications to identify the different frames which contain data from the single record;

means coupled to said frame generating means for inserting in said frames indications to differentiate between data records contained in the same frame; and means coupled to the identifying means for transmitting said frames to the other node.

2. A device for transferring data between nodes coupled to a network having a carrier sense multiple access/collision detect protocol for such data transfer, the device at each node comprising:

means for identifying data records to be transferred to another node;

means coupled to the identifying means for generating frames containing data from the data records to be transmitted;

means coupled to the frame generating means for inserting a more bit in a pad field of a frame to indicate that there is more data in a record;

means coupled to the frame generating means for inserting a record number in the pad field of a frame to indicate an ordering of data in a record;

means coupled to the network for receiving at least one frame from the network;

means coupled to the frame receiving means for assembling a record from data contained in multiple frames, each of said frames having a more bit and a record number.

3. A device for transferring data between nodes coupled to a network having a carrier sense multiple access/collision detect protocol for such data transfer, the device at each node comprising:
   means for identifying data records to be transferred to another node;
   means coupled to the identifying means for generating frames containing data from the data records to be transmitted;
   means coupled to the frame generating means for detecting short record;
   means coupled to the frame generating means for combining short records in a frame to be transmitted; and
   means coupled to the frame generating means for inserting representations of record lengths of said combined records in a pad field of said frame.

4. The device of claim 3 further comprising:
   means coupled to the network for receiving at least one frame from the network;
   means coupled to the frame receiving means for detecting if there are record length representations in the pad field; and
   means coupled to the frame receiving means for assembling records in a received frame in accordance with the record length representations.

5. The device of claim 4 wherein up to 4 records are transmitted to a frame.

6. The device of claim 5 wherein the record length is compatible with a single line of text displayable on a CRT.

7. The device of claim 5 wherein the record length is compatible with a single line of text printable by a printing device.

8. A device for transferring data between nodes coupled to a network having a carrier sense multiple access/collision detect protocol for such data transfer, the device at each node comprising:
   means for identifying data records to be transferred to another node;
   means coupled to the identifying means for generating frames containing data from the data records to be transmitted;
   means coupled to the frame generating means for inserting a more bit in a pad field of a frame to indicate that there is more data in a record;
   means coupled to the frame generating means for inserting a record number in the pad field of a frame to indicate an ordering of data in a record;
   means coupled to the network for receiving one or more frames from the network;
   means coupled to the frame receiving means for assembling a record from data contained in multiple frames, each of said frames having a more bit and a record number.
   means coupled to the frame generating means for detecting short records;
   means coupled to the frame generating means for combining short records in a frame to be transmitted; and
   means coupled to the frame generating means for inserting representation of record lengths of said combined records in a pad field of said frame.

9. The device of claim 8 wherein the more bit and record number comprise a single predetermined byte of the pad field of each frame.

10. The device of claim 8 further comprising:
    means coupled to the frame generating means for indicating optimal frame size;
    means coupled to the frame generating means for combining records to maintain an optimal size frame; and
    means coupled to the frame generating means for breaking records into multiple frames to maintain an optimal size frame.

11. The device of claim 8 wherein the representations of field length each comprise a predetermined byte of the pad field.

* * * * *